United States Patent [19]

Koelbl

[11] 4,449,995
[45] May 22, 1984

[54] HINGED WINDOW CLOSURE FOR FLOAT GLASS PROCESSING CHAMBER

[75] Inventor: Harold M. Koelbl, Burkburnett, Tex.

[73] Assignee: PPG Industries, Inc., Pittsburgh, Pa.

[21] Appl. No.: 400,808

[22] Filed: Jul. 22, 1982

[51] Int. Cl.³ .............................................. C03B 5/16
[52] U.S. Cl. ........................................ 65/158; 65/157; 65/182.5; 34/242; 292/259 R
[58] Field of Search ...................... 65/157, 158, 182.5; 34/242; 292/259 A, 259 R

[56] References Cited

U.S. PATENT DOCUMENTS

| | | | |
|---|---|---|---|
| 2,160,260 | 5/1939 | Dwyer | 49/278 X |
| 2,753,968 | 7/1956 | Carnick | 49/278 X |
| 3,387,551 | 6/1968 | Hughes | 98/88 |
| 3,473,905 | 10/1969 | Jago et al. | 65/27 |
| 3,725,028 | 4/1973 | Cramer | 65/182 R |
| 3,762,908 | 10/1973 | Labrot et al. | 65/158 |

*Primary Examiner*—Arthur D. Kellogg
*Attorney, Agent, or Firm*—Donald Carl Lepiane; Rita M. Irani

[57] ABSTRACT

A window closure for sealing a viewing and access port in a glass forming chamber includes a handle pivotally mounted to a glass pane supporting frame, the frame being hinged to the wall of the forming chamber below the viewing port. The handle and hinging facilities are secured to the frame outside the perimeter of the port to provide an unobstructed view into the chamber when sealed, and to provide unobstructed access through the port when opened. The handle is provided with a pair of oppositely disposed hooks for engaging correspondingly located pins secured to the chamber wall. The closure is opened by pivoting the handle to disengage the hooks from the pins, and the handle is then used to rotate the entire closure about the hinge to come to rest below the port, parallel to the chamber wall. The closure further includes facilities for detachably securing the glass pane to the frame for easy replacement of the glass.

6 Claims, 2 Drawing Figures

HINGED WINDOW CLOSURE FOR FLOAT GLASS PROCESSING CHAMBER

BACKGROUND OF THE INVENTION

1. Field of the Invention

The present invention relates to a movable window closure for a glass manufacturing chamber and in particular, for a float glass forming chamber.

2. Discussion of the Technical Problems and Presently Available Techniques

In the float glass manufacturing process, molten glass flows through a forming chamber supported on a bath of molten metal, typically tin. The forming chamber usually has several viewing ports or openings in the chamber wall, which are sealed with glass blocks or windows, for observing the chamber interior. The window edges are sealed to minimize the ingress of the exterior ambient atmosphere into the chamber. More particularly, the atmosphere within the chamber usually has a temperature from about 600° C. (1112° F.) to over about 1000° C. (1830° F.) and includes a reducing gas to prevent or minimize tin oxidation. Tin oxide within the chamber is undesirable because it can condense on the chamber ceiling and can drop onto the molten glass making the subsequently formed glass unacceptable. For this reason, it is necessary to minimize the entry of oxygen into the chamber.

A drawback of sealing the window edges is that deposits on the interior surface of the glass blocks or windows interfere with visibility into the chamber, and therefore require frequent cleaning. Furthermore, when the window edges are sealed, removing the window can result in breakage. To minimize the undesirable deposits on the interior of glass viewing ports, U.S. Pat. No. 3,473,905 to Jago et al. teaches a viewing structure attached to a wall of a glass forming chamber. Facilities maintain a curtain of nitrogen across the interior face of a glass panel fixed in the exterior opening of the viewing structure. Although this structure minimizes the deposits on the interior face of the window, thereby increasing the time interval between cleaning, it does not entirely eliminate them. Therefore, when the glass panel is removed, the problem of breakage still exists.

As can be appreciated, replacing windows by removing the window edge seal is a time consuming process which cannot be easily accomplished without damaging or destroying the windows. Furthermore, problems occasionally arise inside the chamber which require immediate access to the interior of the chamber, and, in the past, windows have been purposely broken to quickly provide the needed access opening. Although this provides the necessary access opening, the time that the chamber remains open until the fractured window is replaced allows excessive oxygen to enter the chamber and is therefore unacceptable.

U.S. Pat. No. 3,762,908 to Labrot et al. teaches a removable closure for sealing an access port in a float glass forming chamber which does not require resealing with refractory mortar each time it is removed. The Labrot closure includes a holding frame for biasing the closure lid against the end of a tubular metal ring. The holding frame includes a pair of hooked members which overhang the top portion of the metal ring and slide into a pair of slotted members attached to the lower portion of the metal ring. The closure lid is attached to the holding frame by a central pin. The holding frame is a generally H-shaped frame having four eccentric levers interspaced along the vertical portions of the H, for biasing the closure lid against the metal ring. Disengagement of the closure lid from the metal ring is accomplished by rotating all four eccentric levers, and lifting the frame upward for disengagement of the hooks from the metal ring and of the lower portion of the vertical frame members from the slot. The entire closure lid and frame are then moved away from the chamber wall, providing access to the chamber through the opening.

Although the teachings of U.S. Pat. No. 3,762,908 eliminates the drawbacks associated with fixably sealed windows, it has other drawbacks. For example, the entire lid and holding frame must be lifted and removed from the wall of the chamber for access to the interior of the chamber. The removal of the entire lid is a time limitation when quick emergency access to the interior of the chamber is desired. Furthermore, if the lid is provided with a glass viewing area, hurried removal of the lid and/or placement near the opening can lead to inadvertent breaking of the glass. Still a further drawback of the Labrot closure is that the holding frame obstructs the view into the chamber when the closure is in place, because the biasing mechanism and the frame are, by design, necessarily located within the perimeter of the opening in the chamber wall.

As can be appreciated, it would be advantageous to have a window closure to provide access to the interior of the chamber which does not have the drawbacks of presently available windows.

SUMMARY OF THE INVENTION

The invention relates to a removable window closure suitable for use in a glass forming chamber to seal an access opening in the chamber wall while providing a window for viewing the interior of the chamber. The closure includes a glass pane detachably biased against a supporting frame. The frame is rotatably mounted to the chamber by a hinge. A handle pivotally mounted to the frame, e.g. to each side of the frame, engages latching facilities provided on the chamber wall to bias the frame against the wall to seal the opening. When the closure is in the latched position, the window overlies the chamber opening to seal the opening, and the handle is outside the perimeter of the frame. To provide access to the chamber, the handle is rotated relative to the frame, e.g. rotated upward, to disengage the latching facilities, and, using the handle, the closure is rotated about the hinge away from the opening to provide fast and easy access to the chamber interior. Reversing the above procedure reseals the opening.

DETAILED DESCRIPTION OF A PREFERRED EMBODIMENT

Figure 1:
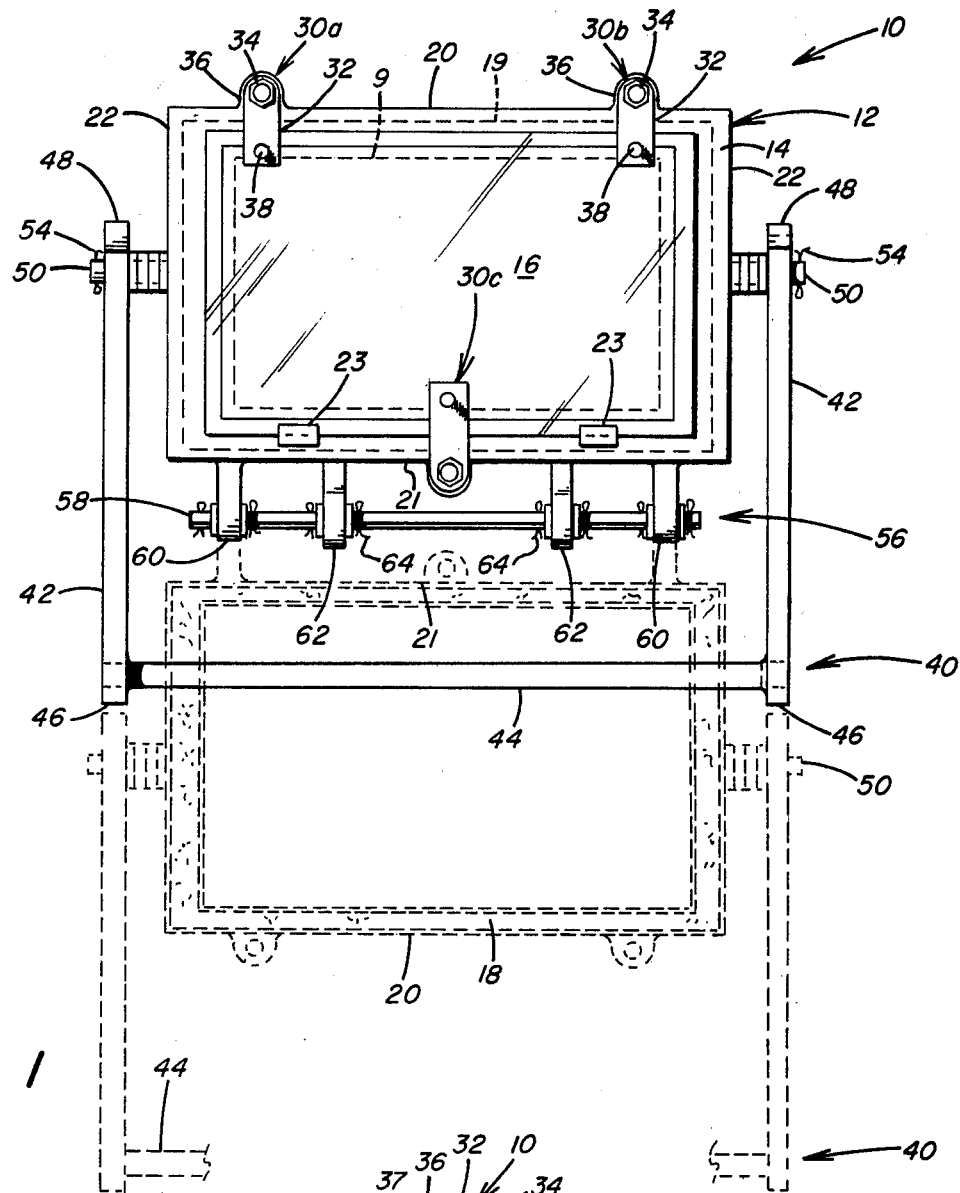
FIG. 1 is a front elevated view of a window closure incorporating features of the invention showing the window by way of solid lines in its locked position and by way of phantom lines (with portions removed for the purpose of clarity) in its open position.
Figure 2:
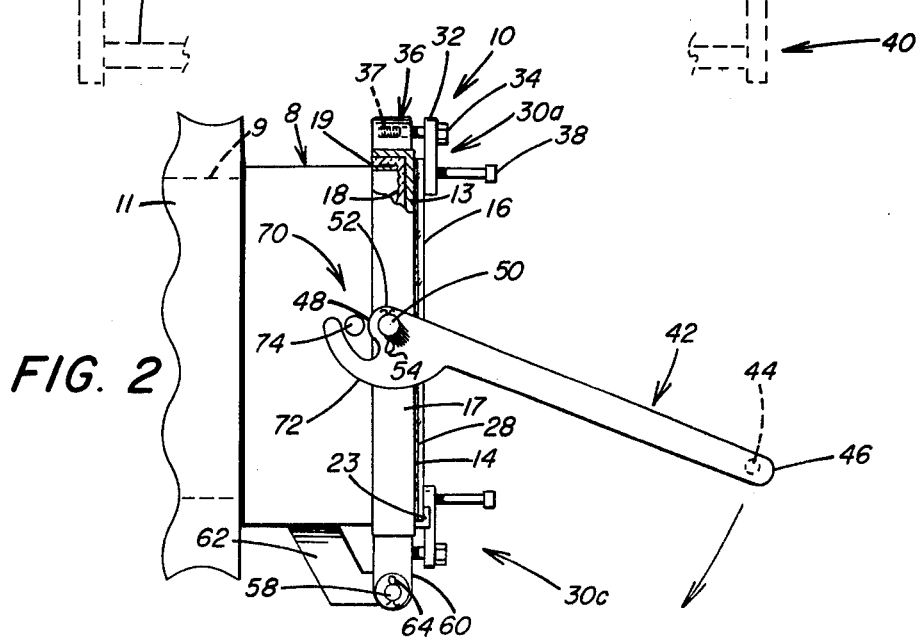
FIG. 2 is a side elevated view having a portion cut away and showing the window closure mounted on and in overlying relation to a viewing structure, prior to locking the closure in its sealed position.

As shown in FIG. 2, window closure 10, incorporating features of the invention, was mounted on viewing structure 8 which was mounted over an opening 9 formed in a wall 11 of a glass forming chamber. Although not limiting to the invention, the viewing structure 8 was provided with facilities (not shown) for maintaining a protective curtain of inert gas, e.g. nitrogen, across the interior face of the window closure 10. The curtain of gas isolates the interior of the window closure from the atmosphere within the forming chamber to minimize undesirable deposits on the interior of the window closure. In addition, the curtain of gas minimizes the ingress of ambient air into the chamber when the window closure 10 is in the open position, as shown in phantom lines in FIG. 1. The viewing structure having a gas curtain as taught in U.S. Pat. No. 3,473,905, may be used in the practice of the invention and the teachings thereof are incorporated by reference. As will be appreciated, the window closure 10 can be conveniently used in place of the glass window described in U.S. Pat. No. 3,473,905.

The window closure 10 includes a frame 12 conveniently constructed of angle iron sections with one leg, e.g. leg 13 (see FIG. 2), of each section providing an exterior surface 14 for supporting a glass pane 16, and the other leg, e.g. leg 17 (see FIG. 2) providing a side extension for surrounding outer opening 19 of the viewing structure 8. Although not limiting to the invention, it is advantageous to provide a compressible refractory insulating material 18, e.g. of the type manufactured and sold by Babcock-Wilcox Company of New York, N.Y. under the tradename "Kaowool", on the interior recess formed by the angle iron legs 13 and 17 of the frame 12 to provide a compressible seal between the frame 12 and the peripheral edge of the viewing structure 8, i.e. the edge defining the opening 19, as shown in FIG. 2, for reasons which will be appreciated in light of the following discussion.

As shown in FIG. 1, lower horizontal frame member 21 is provided with a pair of spaced flanged members 23 to support the glass pane 16 on its lower edge. The glass pane is conveniently secured in position by clamps secured to the frame 12, e.g. a pair of spaced spring loaded clamps 30$a$ and 30$b$ secured to upper horizontal frame member 20 and a single center spring loaded clamp 30$c$ secured to the lower horizontal frame member 21. The clamps are identical in structure and mounting; therefore, only the clamp 30$a$ will be discussed. In the practice of the invention, the clamp 30$a$ included a plate 32 rotatably mounted at one end on a screw 34 secured in a block 36 containing spring 37 mounted to the leg 17 of the frame member 20. The opposite end of the plate 32 had a threaded hole for capturing thumb screw 38. Rotating the thumb screw 38 in a first direction biases the pane of glass 16 against the exterior supporting surface 14 by compressing the spring 37 in the block 36. Rotating the thumb screw in the opposite direction releases the spring 37 and hence the plate 32 and the glass pane 16 for ease of removal. As can be appreciated, disengaging the glass pane 16 from the frame 12 for cleaning or replacement involves the simple procedure of loosening the thumb screws 38 to disengage the plates 32 from the glass pane 16. The glass pane may then conveniently be removed by sliding the replacement pane along the frame surface 14, e.g. from left to right as viewed in FIG. 1, into engagement with the pane 16 to be replaced, and thereafter sliding the pane 16 out of engagement with the flanges 23 as the replacement pane is sliding into engagement with the flanges 23. Repositioning the plates 32 to overlie the replacement pane and tightening the thumb screws 38 then secures the replacement glass to the frame 12. As can be appreciated, this procedure allows very little escape of nitrogen from the viewing structure 8, or ingress of ambient atmosphere, e.g. oxygen, while the glass pane 16 is being replaced.

As can now further be appreciated, the window closure 10 may be readily converted into an access closure by replacing the glass pane 16 with an opaque plate, e.g. a metal plate or a glass substrate having an opaque coating. The only requirement is that the plate be capable of withstanding the atmosphere and temperature within the chamber where the window closure is used.

Although not limiting to the invention, additional sealing material 28, shown in FIG. 2, may be provided on the supporting surface 14 of the frame 12 to prevent ambient atmosphere, e.g. oxygen, from entering the chamber interior and/or for minimizing the escape of nitrogen from the chamber interior by way of the glass 16—frame 12 interface. As practiced, $\frac{1}{8}$ inch (0.32 cm.) refractory insulating paper was secured to the exterior face 16 of the frame 12 with a suitable adhesive.

A handle 40 has two longitudinal members 42, which were about $8\frac{1}{2}$ inches (21.6 cm.) in length, interconnected by crossbar 44, about 14 inches (35.6 cm.) in length at a first end 46 of the members 42. The handle members 42 were each pivotally connected adjacent a second end 48 to the frame by a respective extension 50. Each extension 50 was secured to each of the legs 17 of a side frame section 22 about midway between its ends and was rotatably secured in the handle member 42, e.g. by cotter pin 54.

The frame 12 was mounted for pivotal movement toward and away from the viewing structure by a hinge 56. In the preferred embodiment, the hinge 56 included a rod 58 passing through a first pair of outer spaced plates 60 secured to the lower horizontal frame member 21 and through a second inner pair of spaced plates 62 secured to the lower exterior face of the viewing structure 8. Although not limiting to the invention, it is preferred to insert suitable restraining facilities in the rod, e.g. cotter pins 64, adjacent the plates 60 and 62 to limit lateral movement of the rod relative to the plates while permitting some lateral movement for positioning the frame to overlie the structure 8. Although the description is given with reference to the viewing structure 8, it will be apparent to those skilled in the art that the invention is not so limited and may be readily adapted for attachment directly to the chamber wall 11.

With reference to FIG. 2, as practiced, latches 70 (one only shown in FIG. 2) included a pair of eccentrically curved hooks 72 secured to each longitudinal handle member 42 adjacent the end 48. A pair of pins 74 was secured to the exterior lateral face of the structure 8 in a location corresponding to about the center of the groove formed by the hooks 72 when the frame 12 overlies the structure 8. With this arrangement, the handle 40 is rotated and lifted upward by way of the crossbar 44 from its phantom position shown in FIG. 1 to lift and align the frame 12 to overlie the outer opening 19 of the structure 8, as shown in FIG. 2. Thereafter, the crossbar 44 is rotated downward from its position shown in FIG. 2, as indicated by the arrow, to rotate the hook 72 about the pin 74 to bias the frame toward the viewing structure 8 and compress the insulating material 18 to seal the opening 19.

As can now be appreciated, the handle 42 and the frame 12 arrangement permits an unobstructed view of the interior of the chamber when the window closure is in its sealed position, because the closure mechanism is by design located outside the opening 9 in the chamber wall 11. In addition, the window closure 10 can be quickly and easily opened for access into the chamber 5 by merely rotating the handle and then lowering the frame in one simple motion. As can further be appreciated, the location of the window closure below the viewing box in its open stationary position allows full use of the access opening and at the same time, keeps the closure at hand for quickly resealing the opening.

It is understood that the above example is presented for illustration purposes and is not limiting to the invention, the scope of which is defined by the claims which follow.

What is claimed is:

1. A cover for an opening in a chamber wall of a glass manufacturing chamber, the opening providing access to the interior of the chamber, comprising:
    a frame having an exterior supporting surface, an interior surface and opposite side portions;
    a plate;
    means mounted on said frame and engaging said plate for securing said plate on the exterior supporting surface of said frame;
    means for pivotally mounting said frame to wall portions of the opening to pivotally move said frame into a first position overlying the opening and toward a second position away from the opening;
    a handle having a pair of spaced longitudinal members each having a first end portion and an opposite second end portion and a transverse member interconnecting the first end portion of each of said longitudinal members;
    means between end portions of each of said longitudinal members for pivotally mounting a one of said pair of longitudinal members to each of said side portions of said frame; and
    latching means for biasing said frame toward the opening, said latching means including a first element mounted on exterior wall portions of the opening or the chamber wall and a second element mounted on the second end portion of each of said longitudinal members of said handle such that said second element of said latching means engages said first element of said latching means when said frame overlies the opening and said first and said second elements of said latching means cooperate with one another to (1) bias said frame toward the opening when said handle is pivoted into a locking position such that the transverse member of said handle does not overlie said plate and (2) release said frame from the opening when said handle is pivoted away from the locking position.

2. The cover as set forth in claim 1, wherein said first element of said latching means comprises a pin arrangement or a hook assembly and said second element of said latching means comprises a hook assembly or a pin arrangement respectively.

3. The cover as set forth in claim 2, wherein the wall portions of the opening extend outwardly from and are mounted on the chamber wall and wherein said pivotally mounting means includes a hinge having one part secured to the wall portions of the opening and another part of said pivotally mounting means is secured to said frame and said first element of said latching means is mounted on the wall portions of the opening.

4. The cover as set forth in claim 3, wherein said plate is substantially transparent and wherein said plate is detachably secured to said frame.

5. The cover as set forth in claim 4, wherein the outer walls of the opening includes aperatures for passing a gas to provide a curtain of gas between said plate and the chamber interior.

6. The cover as set forth in claim 5 further comprising sealing means interposed between said frame and the wall portions of the opening, said sealing means including a recess in said interior surface of said frame for receiving a compressible material.

* * * * *